United States Patent [19]

Garska et al.

[11] Patent Number: 4,458,097

[45] Date of Patent: Jul. 3, 1984

[54] CONVERSION OF CERTAIN HYDROCARBONS USING DIVALENT-COPPER-CONTAINING ZSM-5 TYPE CATALYST

[75] Inventors: Daniel C. Garska, St. Albans, W. Va.; James S. Ritscher, Ossining, N.Y.

[73] Assignee: Union Carbide Corporation, Danbury, Conn.

[21] Appl. No.: 373,728

[22] Filed: Apr. 30, 1982

[51] Int. Cl.$^3$ .......................... C07C 3/03; C07C 3/20
[52] U.S. Cl. .................................. 585/415; 585/417; 585/418
[58] Field of Search ............... 585/413, 415, 417, 418, 585/419, 433, 434

[56] References Cited

U.S. PATENT DOCUMENTS

| | | | |
|---|---|---|---|
| 3,827,968 | 8/1974 | Givens et al. | 585/415 |
| 4,157,293 | 6/1979 | Plank et al. | 585/415 |
| 4,170,571 | 10/1979 | Ritscher | 585/415 |

Primary Examiner—Delbert E. Gantz
Assistant Examiner—A. Pal
Attorney, Agent, or Firm—David Fink

[57] ABSTRACT

By-product effluent streams from pyrolytic hydrocarbon cracking processes, containing monoolefins and diolefins, are treated to hydrogenate the olefins and to aromatize the aliphatics, with a catalyst essentially comprising divalent-copper-containing ZSM-5 type molecular sieve catalyst.

15 Claims, No Drawings

CONVERSION OF CERTAIN HYDROCARBONS USING DIVALENT-COPPER-CONTAINING ZSM-5 TYPE CATALYST

CROSS-REFERENCE TO RELATED APPLICATIONS

This application is related to Ser. No. 373,727, filed concurrently herewith and to Ser. No. 373,729, also filed concurrently herewith.

BACKGROUND OF THE INVENTION

1. Field Of The Invention

This invention relates to the preparation of streams containing recoverable benzene, toluene, and xylenes ("BTX") from initial by-product effluent streams that contain other components, notably monoolefins and diolefins. In one aspect, the invention concerns the removal by conversion of these other components which ordinarily prevent recovery by distillation or solvent extraction of benzene-toluene-xylenes aromatics from the streams. In another aspect, it concerns a low severity process for treating the by-product streams with a specified catalyst, and under defined reaction conditions, both to produce benzene-toluene-xylenes from the initial stream and to reduce or eliminate those components that otherwise would interfere with the economic recovery of these aromatics from the streams.

2. Description Of Prior Art

The preparation of light olefins and diolefins, mainly ethylene, propylene, and butadiene, by the thermal pyrolysis, or cracking, of petroleum fractions is well known and widely practiced. (See for example, Kirk & Othmer's "Encyclopedia of Chemical Technology", Second Edition, Vol. 8, pp. 503–514.) In these pyrolitic cracking processes, hydrocarbons ranging from ethane, through LPG (liquefied petroleum gas, chiefly propane with a few percent butanes), naphtha, heavy gas oil, to even crude petroleum oil, are subjected to high temperature conditions, at low pressure and for a short time, to produce a maximum of the desired product. These thermal processes vary widely, and the yields from any one process depend not only on process equipment and conditions, but on such extraneous factors as the presence or absence of diluents and other reactants, e.g., oxygen, hydrogen, steam, etc.

Even the best of the pyrolitic processes is less than ideally selective. As a consequence, the total reactor effluent will contain not only the desired olefin or diolefin, but a variety of other components, ranging from methane gas to high boiling polycyclic hydrocarbons. These by-products are conventionally separated, usually by distillation and/or absorption, so as to concentrate the main desired products for ultimate recovery, and to produce one or more by-product effluent streams.

The by-product effluents contain a mixture of hydrocarbon types, including paraffins, monoolefins, diolefins, aromatics, cyclics, and various substituted and polynuclear aromatics. Unless the by-product effluent stream or streams contains a particularly valuable or desirable component, making removal economical, the by-product effluent streams are of only limited utility. The lighter gases are useful only as fuel, while the heavier, normally liquid, components, usually termed "dripolene," if not hydrogenated and then subjected to BTX extraction, are customarily either burned locally as fuel or else hydrogenated to saturate the unstable diolefins, and then blended with other gasoline fractions as motor fuel.

It has long been recognized that some of these by-product effluent streams, particularly the dripolene fractions, contain potentially valuable benzene, toluene, and xylenes (including ethylbenzene). Unfortunately, they also contain diolefins and monoolefins, which effectively interfere with most existing solvent extraction processes, such as the Udex and Sulfolane processes, for the extraction of aromatics from paraffins. Some of these olefins have boiling points similar to those of the BTX aromatics, and hence cannot be removed by fractional distillation. Selective hydrogenation to saturate the olefins and diolefins is practiced, and widely so, but the process tends to be expensive. Moreover, the diolefins in dripolene tend to be thermally unstable, forming catalyst-deactivating and exchanger-fouling carbonaceous deposits.

A variety of catalysts has been proposed for treating one or more of the by-product effluents from pyrolitic cracking processes so as to render the streams more valuable or more amenable to subsequent processing. (A tabulation of representative references identifying many of these processes, and many catalysts having conceivably useful activity for these processes, is appended.)

It is an object of the present invention to provide a process for preparing a stream from which benzene-toluene-xylenes may be recovered, by catalytically treating by-product effluent streams from pyrolytic hydrocarbon cracking processes. A further object is to provide a process for treating such by-product effluent stream in a simplified, low severity, operation so as both to produce benzene-toluene-xylenes (BTX), and, simultaneously, to decrease the content of interfering components. Still another object is to remove those monoolefins and diolefins which have heretofore interfered with the solvent extraction of BTX from dripolene and the like.

SUMMARY OF THE INVENTION

Briefly, in accordance with the invention, a stream from which benzene, toluene, and xylenes may be recovered readily is prepared by contacting a pyrolitic hydrocarbon cracking by-product effluent stream, containing substantial amounts of interfering monoolefins and diolefins, with a divalent-copper-containing ZSM-5 type molecular sieve catalyst under low severity hydrocarbon processing conditions. As a result of this treatment, not only are the olefins hydrogenated to non-interfering aliphatics, but a substantial fraction of the aliphatics is dehydrocyclized to benzene-toluene-xylenes.

One of the remarkable aspects of the invention is that the same low severity conditions of temperature, pressure, and space velocity, which are suitable for hydrogenation with a Cu-ZSM-5 catalyst, are also suitable for the dehydrogenation reaction involved in aromatization. Thus, a simple processing scheme, with only a single reactor stage, is often adequate both to reduce to a minimal content, or eliminate the olefinic constituents that would interfere with the economic recovery of aromatics, and to produce benzene-toluene-xylenes from the feed stream.

A further important advantage of the invention resides in its ability to process any of a variety of the by-product effluent streams from pyrolitic cracking processes. As set out more fully below, these by-product effluent streams customarily include a C4 fraction composed predominantly of butanes, butenes, and butadiene; a C5 fraction composed mainly of pentanes, pentenes, pentadienes and cyclic C5 compounds; a C6-C8 "dripolene" fraction containing BTX aromatics together with interfering olefins (i.e., having a similar boiling range); and a C9-plus fraction, including some BTX along with higher alkylated benzenes and polynuclear aromatics and aliphatics. Each of these streams, plus others that may be present in a particular plant, may be processed according to the invention.

The catalysts for use with the present invention are a recently discovered class of copper zeolites which are both high siliceous and contain an extraordinary amount of zeolitic divalent copper cations. These zeolitic catalysts have the crystal structure of the ZSM-5 type of aluminosilicates, at least 80% of the AlO4-tetrahedra thereof being associated with, i.e. electrovalently neutralized by, a zeolitic divalent-copper cation. The divalent-copper-containing ZSM-5 type catalyst composition, in the dehydrated state, can be expressed empirically in terms of mole ratios of oxides as:

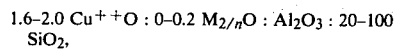

1.6–2.0 Cu$^{++}$O : 0–0.2 M$_{2/n}$O : Al$_2$O$_3$ : 20–100 SiO$_2$, wherein "M" is at least one cation other than Cu$^{++}$. Prior to copper exchange, the aluminosilicate zeolite of the ZSM-5 type has a silica/alumina ratio between about 20 and 100, and an x-ray diffraction pattern (calcined 600° C. for one hour) having at least the d-spacings set forth below:

| X-RAY DIFFRACTION PATTERN |
|---|
| Interplanar Spacing d(A) |
| 11.1 ± 0.2 |
| 10.1 ± 0.2 |
| 3.85 ± 0.07 |
| 3.74 ± 0.05 |
| 3.72 ± 0.05 |

The catalysts for use with the present invention have been described previously, in Ritscher U.S. Pat. No. 4,170,571. The disclosure of this patent, and all other patents identified herein, are hereby incorporated by the reference.

Various other aspects of the invention are set out below.

DESCRIPTION OF PREFERRED EMBODIMENTS

1 Pyrolitic Cracking Processes

Pyrolitic cracking processes for the preparation of light olefins and diolefins such as ethylene, propylene, and/or butadiene, have been described in the literature, and accordingly no detailed exposition is called for here.

In essence, the thermal pyrolysis, or cracking, of petroleum fractions may utilize as feed stocks hydrocarbons such as ethane, LPG (liquefied petroleum gas, chiefly propane with a few percent butanes), naphtha, heavy gas oil, or crude petroleum oil. These are subjected to controlled high temperature, low pressure, short time, pyrolitic cracking to produce the desired product or products. Thereafter the reactor effluent is subjected to a combination of condensation, fractional distillation, absorption, and perhaps other unit operations, to segregate various effluent streams enriched in one or more desirable components. The precise arrangement of product recovery streams forms no part of the present invention, and indeed it is probable that no two pyrolitic cracking plants utilize the same recovery scheme.

For example, the reactor effluent liquid may be subjected to fractional distillation to separate one or more fractions rich in benzene (B.P. 80.103° C.), toluene (B.P. 110.623°.), and/or the xylenes, namely ethylbenzene (B.P. 136.187° C.), p-xylene (B.P. 138.348° C.), m-xylene (B.P. 139. 102° C.), and o-xylene (B.P. 144.414° C.). This fraction, or fractions is desirably solvent extracted, as for example by the Udex or Sulfolane process, to recover the BTX aromatic/aromatics.

In the absence of prior treatment, such as by the process of the present invention, solvent extraction is ineffective to extract the aromatics from the remaining aliphatics, inasmuch as solvents selective for aromatics will also extract many olefins and diolefins. However, the diolefins and the aromatics cannot be separated by fractional distillation; for example, benzene, with a boiling point of 80.103° C., is not easily distilled from the 2,4-hexadienes, which boil at about 80.0° C. Similarly, the various dimethylpentenes boil within a range of 72.2° C. to 85.0° C.

Be that as it may, and howsoever produced or constituted, there inevitably will be one or more by-product effluent streams which contain diverse mixtures of hydrocarbon (and perhaps non-hydrocarbon) components, varying both with respect to boiling point and chemical classification. It is this diversity that either complicates or prevents the recovery of useable components.

By way of example, in an illustrative pyrolitic cracking plant, the total reactor effluent may be segregated into a predominantly gaseous fraction including recoverable ethylene and propylene; a crude C4 fraction, a distillation cut which includes hydrocarbons with primarily four carbon atoms each; a crude C5 fraction, another distillation cut which primarily contains hydrocarbon molecules with five carbon atoms each, and generally containing a large quantity of unsaturated and cyclic compounds, including olefins and lesser amounts of C4's and lighter, C6's and heavier; a C6-C8 fraction, sometimes referred to as pyrolysis gasoline or dripolene; and a C9 plus fraction, a heavier distillation cut which primarily includes hydrocarbons with at least nine carbon atoms, along with lesser amounts of C5-C8 hydrocarbons. The C9 fraction generally is produced as the distillation bottoms from the processing of dripolene to remove pyrolysis gasoline, and contains components as widely varying as styrene, ethyltoluenes, and trimethylbenzenes, to heavier compounds including ethylnaphthalene, diphenyl, and dimethylnaphthalene.

An illustrative C4 fraction, giving both the range and a typical composition, is set out in Table I below:

TABLE I

| Illustrative C4's Composition | | |
|---|---|---|
| Compound | Observed Range | Typical Composition |
| Lights | 0.4–5.0 wt. % | 1.1 |
| Methylacetylene, Propadiene | 0.1–1.0 | 0.7 |
| n & i-Butane | 2.4–15.0 | 3.8 |
| 1-Butene and Isobutylene | 20.0–39.0 | 33.8 |
| t-2-Butene | 4.0–7.0 | 5.7 |
| c-2-Butene | 3.0–5.0 | 4.5 |
| 1,3-Butadiene | 41.0–54.0 | 44.6 |
| Vinylacetylene | 0.4–1.5 | 0.7 |

TABLE I-continued

| | Illustrative C4's Composition | |
|---|---|---|
| Compound | Observed Range | Typical Composition |
| Ethylacetylene | 0.1–0.5 | 0.2 |
| $C_5+$ | 0.2–5.0 | 4.1 |

Illustrative $C_5$ compositions, from two different plants, "A" and "B," are likewise represented in Table II below:

TABLE II

| | Illustrative C5's Compositions | | | |
|---|---|---|---|---|
| | Plant A | | Plant B | |
| | Observed Range | Typical Composition | Observed Range | Typical Composition |
| C4 and Lighter | 0–1.5 wt. % | 0.7 | 1.4–8.1 | 5.5 |
| n & i-Pentanes | 0.14.4 | 7.2 | 17.3–44.60 | 23.6 |
| C5 Olefins | 0.1–11.3 | 4.6 | 6.6–37.4 | 9.9 |
| Pentadienes | 9.7–35.3 | 20.0 | 3.5–12.9 | 4.2 |
| Isoprene | 2.4–43.0 | 13.1 | 5.0–16.8 | 5.9 |
| Cyclopentane | 1.6–7.5 | 3.2 | 0–2.0 | — |
| Cyclopentene | 2.2–10.3 | 5.4 | 2.0–14.4 | 2.3 |
| Cyclopentadiene | 0.60–2.8 | 1.4 | 1.0–20.6 | 4.6 |
| C6 Paraffins | 1.1–7.2 | 4.2 | 1.3–10.5 | 10.1 |
| C6 Olefins | — | — | 0.3.0 | 0.2 |
| Benzene | 0.4–5.1 | 1.3 | 0–23.8 | 23.8 |
| Dicyclopentadiene | 19.3–48.1 | 32.1 | 1.0–21.0 | 1.8 |
| Other $C_6+$ | 1.5–14.8 | 6.8 | 0.9.0 | 8.1 |

Illustrative $C_9$ compositions, again from plant "A" and Plant "B", are described in Table III below:

TABLE III

| | Illustrative C9's Compositions | | | |
|---|---|---|---|---|
| | Plant A | | Plant B | |
| | Observed Range | Typical Composition | Observed Range | Typical Composition |
| $C_5$–$C_8$ Nonaromatics | 0.5–5.4 | 0.5 | 0.2–3.4 | 0.2 |
| BTX | 0–9.8 | 1.7 | 0–31.9 | 1.2 |
| Styrene | 0.3–10.0 | 1.8 | 0.16.8 | 5.0 |
| Dicyclopentadiene | 7.2–14 40.0 | 29.2 | 4.7–42.0 | 40.5 |
| Methyl dicyclopentadiene and Dimethyldicyclopentadiene | 4.4–21.2 | 4.4 | 0–6.5 | 1.6 |
| Methyl Stryenes | 2.3–19.0 | 6.8 | 0.15.0 | 3.6 |
| $C_3$ Benzenes | 8.0–26.0 | 12.7 | 0–12.5 | 7.3 |
| Indane | 0.2–16.9 | 13.8 | 0–6.9 | 0.2 |
| Indene | 3.9–15.6 | 9.9 | 1.0–13.0 | 9.8 |
| Naphthalenes | 0.6–9.3 | 3.5 | 3.0–15.0 | 14.1 |
| Other $C_{10}+$ | 10.7–32.6 | 15.7 | 14.6–48.6 | 16.7 |

It will be appreciated, as noted earlier, that these compositions may vary quite widely, depending upon the initial feed to the pyrolitic cracking unit, the type of pyrolitic cracking unit, conditions in the pyrolitic unit, and the type and conditions of the product recovery section. The by-product effluent streams may likewise be blended with each other where this is desired, or may include recycle components from elsewhere in the product recovery section.

2. Catalyst

The catalyst used in the present process is one or more of a recently discovered class of divalent-copper-containing ZSM-5 type zeolites, as described in Ritscher U.S. Pat. No. 4,170,571. These catalyst are prepared from materials designated as the "family" of "ZSM-5" or "ZSM-5 type" alumiosilicate zeolites, by the procedure of the Ritscher patent.

The "ZSM-5 type" crystalline aluminosilicate zeolites include "ZSM-5" described in Argauer et al. U.S. Pat. No. 3,702,886 (zeolite prepared from tetrapropylammonium and sodium cations); "ZSM-8," in Rubin et al. British specification No. 1,334,243 (tetraethylammonium plus sodium cations); "ZSM-11," in Chu U.S. Pat. No. 3,709,979 (tetrabutylammonium or tetrabutylphosphonium plus sodium cations); an undesignated material structurally related to (i.e., having a similar x-ray diffraction pattern, but having an infrared spectrum exhibiting no absorption within the range of 3600–3100 $cm^{-1}$) "ZSM-5" (species), described in Grose U.S. Pat. No. 4,257,885. These materials have the X-ray diffraction patterns characterized by the table above.

The ZSM-5 type of zeolite appears to be unique in its ion exchange properties with respect to aqueous ion exchange media containing divalent copper cations. As is evident from the empirical formula set forth above, if the zeolitic $Cu++$ cations known to be present in the present zeolite compositions were associated with the $AlO_4$-tetrahedra in the conventional manner, they would represent from 160 to 200% of the theoretical maximum. Although cation populations somewhat in excess of the theoretical maximum can be attributed to analytical tolerances and impurities in the zeolite composition, other explanations must be provided for values which appear to deviate from the norm as greatly as in the present compositions.

Although not wanting to be bound by any particular theory, the available evidence suggests that the divalent $Cu++$ zeolitic cations in the present zeolites in the as ion-exchanged and unactivated state, are largely hydroxylated cations and are bonded to the zeolite structure through a single copper-to-zeolite bond, i.e. $CuOH+$. This is supported by the fact that the copper cations in this state do not react with CO as monovalent $Cu+$ zeolitic cations are known to do. Also upon vacuum activation at temperatures above about 300° C., these putative hydroxylated $Cu++$ cations are converted to $Cu+$ zeolitic cations as evidenced by their reactivity with CO to form the bidentate complex:

In the unactivated, as-ion-exchanged state, the copper cations which are not present as divalent hydrated species have been established to be essentially monovalent $Cu+$ zeolitic cations by ESR techniques in conjunction with CO reactivity studies. Thus upon dehydration (activation) of the copper exchanged zeolite there is created a form in which substantially all of the copper cations are monovalent and each is associated with a single $AlO_4$-tetrahedron. To obtain the required divalent $Cu++$ cation form it is found that when the monovalent $Cu+$ form is contacted at ambient room temperature (22° C.) with a strong oxidant such as chlorine, ozone or $NO_2$, preferably $NO_2$ or a mixture of $NO_2$ and $O_2$, an essentially stoichiometric conversion to the $Cu++$ form occurs. It can be surmised that these copper-containing cations are, at least in the case where $NO_2$ is the oxidant, somewhat analogous in structure to the hydroxylated divalent copper cations of the unactivated precursor wherein the $N_2$ moiety functions in a similar manner to the hydroxyl group in that case. The same results are obtained if the $NO_2$ plus $O_2$ treatment is simultaneous with the activation (dehydration) of the as-exchanged form of the zeolite.

Accordingly, the present compositions contain copper cations which are both divalent, zeolitic in nature and present in concentrations per $AlO_4$-tetrahedra approximately 160 to 200 percent of that which are obtained by conventional ion exchange of other zeolite compositions.

In preparing the catalyst, it is essential that the ZSM-5 type zeolite starting material has at least 90 percent of its $AlO_4$-tetrahedra associated with alkali metal, preferably lithium, potassium or sodium cations. It is found that even if the requisite number of $AlO_4$- are associated with exchangeable cations other than alkali metal, e.g. H+, Ca++, $NH_4$ or Ba, the catalysts are not produced. It can be theorized that the unique crystal structure of the ZSM-5 type zeolite together with the basic (as opposed to acidic) character of the sodium cation sites may create localized pH conditions favorable to the formation of hydroxylated divalent copper cations, but the validity of this proposition has not been established with certainty.

As disclosed in U.S. Pat. No. 3,702,886, the zeolite species can be synthesized in a form which the zeolitic cations are a mixture of tetrapropylamonium and sodium cations. The concentration of tetrapropylammonium cations in the as-synthesized product is approximately proportional to their relative concentration in the reaction gel with respect to the sodium cations also present. The tetrapropylammonium cations, at least in part because of molecular size considerations, cannot be ion exchanged from the crystal lattice. However, where it is necessary to insert sodium cations into at least some of the sites occupied by the tetramethylammonium species the technique for removing organic cations described in U.S. Pat. No. 3,853,743, A. B. Schwartz, can be employed. This procedure comprises heating the organic cation-containing zeolite at a temperature between about 500° F. and about 1,000° F. in an atmosphere of ammonia or mixtures thereof with nitrogen for a period of 10 minutes to 10 hours. These conditions prevent loss of crystallinity and preserve the cationic sites in the zeolite which can then become occupied by sodium cations upon conventional ion exchange with an aqueous sodium salt solution. The disclosure of U.S. Pat. No. 3,853,743 is incorporated herein by reference.

The ion-exchange procedure for transforming the sodium cation form of the ZSM-5 type starting materials defined hereinbefore is readily accomplished using commonly available copper salts such as $CuCl_2$, $CuSO_4$ and cupric acetate in an aqueous medium. A satisfactory procedure comprises contacting at reflux temperature the staring zeolite with 25 ml. per gram of an aqueous solution containing the cupric salt in a concentration of 0.4 mole per liter of water. Contact is maintained for about 3 hours, and then the procedure is repeated two more times using fresh ion exchange medium. In washing the final zeolite product with distilled water to remove extraneous salts, care should be taken to avoid overwashing and consequent H+ exchange of the copper cation-containing product. Advantageously the pH of the washing water should not be lower than 6.3.

Conversion of the as-exchanged copper ZSM-5 type zeolite to the catalyst is accomplished by contacting same with a strong oxidant, preferably $NO_2$ alone or in an admixture with oxygen, either during or after activation (dehydration) to remove adsorbed water. The relative proportions of oxidant $NO_2$ and zeolite is not a narrowly critical factor, but at least one oxidant molecule should be present for each cation site of the zeolite. As a practical matter a large stoichiometric excess of oxidant will ordinarily be used. It is found that an air atmosphere containing 20 mole percent $NO_2$ is ideal for the purpose. Temperatures of from 25° C. to 375° C. have been found to be satisfactory. Pressure conditions are not a critical factor.

It is preferred to contact the zeolite with the oxidant after the bulk of the adsorbed water is removed but before total dehydration occurs. This procedure suppresses the formation of intermediate Cu+ cations and retains the initially present hydroxylated Cu++ cations in the divalent state. Upon dehydroxylation of the original CuOH+ cation species and the formation of Cu+ cations, it is possible, however, to again form the divalent copper cation species by oxidation, preferably by contact with $NO_2$ at ambient room temperature.

When used in the present process, the copper zeolite may be employed either alone or in intimate admixture with independently active catalytic components, as for example the noble metals such as platinum, or other catalytically active metals such as molybdemun, vanadium, zinc, etc. The techniques of introducing catalytically active metals to a molecular sieve zeolite are disclosed in the literature, and preexisting metal incorporation techniques are suitable. See, for example, Rabo et al. U.S. Pat. No. 3,236,761 and U.S. Pat. No. 3,236,762.

The physical form of the catalyst depends on the type of catalytic reactor being employed. The copper zeolite by itself is a fine-grain granule or powder, and is desirably compacted into a more readily usable form (e.g., larger agglomerates), usually with a silica or alumina binder for fluidized bed reaction, or pills, prills, spheres, extrudates, or other shapes of controlled size to accord adequate catalyst-reactant contact. As indicated, the catalyst may be employed either as a fluidized catalyst, or in a fixed or moving bed, and in one or more reaction stages.

3. Conversion Parameters

An unusual, if not unique, feature of the present invention is that the reaction conditions are low severity as compared with many preexisting processes. Indeed, the conversion parameters, while broad, may be selected to provide a high degree of versatility, depending upon the feed composition and on the desired product quality.

With respect to temperature, a temperature within the range of about 300°–700° C., more preferably within the range of about 350°–600° C., is adequate for many, if not all, conversions. Higher temperatures give more rapid and more complete reaction, but tend to produce undesirable by-products, chiefly coke, and may otherwise disturb the optimum balance of product composition with on-stream ease of operation.

The pressure, almost uniquely, is desirably quite low. Atmospheric pressure operation has been used successfully in the laboratory, but under specific conditions may be as high as 100 atmospheres or more. A desirable range is from atmospheric pressure to about 7 atmospheres. High pressures facilitate hydrogenation; lower pressures facilitate dehydrocyclization. The optimum pressure will therefore depend on process economics, considering whether it is more desirable to hydrogenate olefins than to produce a high yield of BTX aromatics.

Process stream flow rate, as expressed in units of weight hourly space velocity (WHSV), or weight of hydrocarbon feed per unit weight of catalyst, is suitably within the range of about 0.1 to about 20, more desirably about 0.5–5.0. High WHSV's permit more economic plant construction, while lower WHSV's permit more complete reaction at given temperature-pressure conditions.

If desired, a gaseous or gasifiable diluent may be introduced along with the hydrocarbon feed to the silicalite catalyst. This diluent may be inert, typified by steam, nitrogen or a low boiling paraffin, or may be reactive with the feed under catalysis conditions (e.g., hydrogen). Hydrogen is particularly desirable as it minimizes coke formation and deposition on the catalyst, with resulting premature deactivation, and also facilitates hydrogenation. As demonstrated below, however, the technique of the present invention need not utilize hydrogen.

If either an inert or a reactive gas is employed, diluent/hydrocarbon molar (gas volume) ratios, optimally, of from 0.1 to about 10 may be employed.

It is usually necessary that the catalyst be regenerated, either periodically or continuously, to remove the carbonaceous coke-like deposits from the catalyst. In a fluidized bed operation, a portion of the catalyst is continuously withdrawn from the reactor and then subjected to regeneration by combustion with air or other oxygen containing gas, after which it is continuously recycled to the reactor. In a moving bed operation, the removal of catalyst followed by regeneration may be effected either continuously or periodically. In a fixed bed operation, it is generally desirable that two or more reactors be used in parallel, so that when one is processing the hydrocarbon feed, the other is out of service and being regenerated. Regeneration conditions of approximately 450°–650° C., preferably 500°–600° C. may be employed.

4. Example I

A specific example of the present invention, for the conversion of a $C_9$-plus feed, is presented below. From the data, it is apparent that olefins and diolefins are converted by hydrogenation; that acyclic and cyclic nonaromatic components are dehydrocyclized to aromatic compounds; that $C_9$ plus alkybenzenes, indan, indene, and methylstyrenes are converted in substantial part to the more desirable $C_6$–$C_8$ aromatics; and that, apparently, higher alkylnaphthalenes are converted by hydrogenolysis to recoverable naphthalene and methyl naphthalenes. Additionally, it is likely that the organic sulfur and nitrogen contents are lowered.

In the example herein, a $C_9$ plus by-product hydrocarbon effluent from the thermal pyrolysis unit was reacted over 37 g of 1/16 inch extrudates of a catalyst prepared from a ZSM-5 type zeolite, synthesized according to the method of Grose et al. U.S. Pat. No. 4,257,885, and converted to the divalent copper exchanged form by the method of Ritscher U.S. Pat. No. 4,170,571, and bound with a 20% alumina binder. The reaction vessel was a ¾ inch OD stainless steel tubular reactor.

The reaction pressure was ambient; the reaction temperature was 450° C.; and the space velocity of the feed varied from 0.58–0.73 g feed/g catalyst/hr.

Samples of the liquid products, trapped in an ice water condenser, were taken after one hour and after six hours on stream. Five gas product samples were taken periodically.

The feed had the following analysis:

| Compounds | Weight Percent |
|---|---|
| Analysis of $C_9$-Plus Hydrocarbon Feed | |
| $C_5$–$C_8$ Nonaromatics | 0.19 |
| Benzene | 0.31 |
| Toluene | 0.10 |
| Analysis of $C_9$+ Hydrocarbon Feed | |
| Ethylbenzene, Mixed Xylenes | 0.80 |
| Dicyclopentadiene, Styrene | 45.46 |
| $C_9$ Alkylbenzenes, Methylstyrenes | 10.61 |
| Indan | 0.21 |
| Indene | 9.83 |
| Naphthalene | 12.67 |
| Methylnaphthalenes | 1.45 |
| Other $C_9$+ Hydrocarbons | 18.37 |

The gas samples were analyzed on a Hewlett Packard 5830A gas chromatograph equipped with a thermal conductivity detector. A forty foot stainless steel column with an OD of ⅛ inch packed with 20% tributyl-phosphate on 35/80 mesh Chromasorb P (acid washed) was used. The thermal conductivity detector temperature was set at 250° C., and the column temperature was ambient (approximately 20°–22° C.). Gas samples were injected into the column off-line, through an eight port gas switching valve, via a gas syringe. The sample gas volume was approximately 0.3 cc; the carrier gas rate was 30 cc/min of helium.

Liquid samples for both product and feed were analyzed on a Hewett Packard 5730A gas chromatograph, using a 5705A thermal conductivity detector. A ten foot stainless steel column with an OD of ⅛ inch, packed with 15% Carbowax 20M on 40/60 mesh Chromasorb P (acid washed), was used. The detector temperature was set at 250° C. The column was maintained in an oven, with a temperature programmed from 55° C. to 190° C. at 4° C./min; the injector temperature was 250° C. A sample size of approximately 2 μl. was used, and the helium carrier gas rate was 30 cc/min.

The following yields were determined:

| | Product Analysis From Conversion of $C_9$-Plus Hydrocarbons | |
|---|---|---|
| | (Weight Percent Yield) | |
| Compounds | Product 1 hr. | Composition 6 hr. |
| Methane | 3.35 | 0.59 |
| Ethane, Ethylene | 1.46 | 0.32 |
| Propane | 8.90 | 0.37 |
| Propylene | 0.04 | 0.01 |
| $C_4$'s | 4.30 | 1.14 |
| $C_5$ to $C_8$ Nonaromatics | 1.36 | 35.27 |
| Benzene | 14.74 | 2.66 |
| Toluene | 19.54 | 3.53 |
| Mixed Xylenes | 11.57 | 4.49 |
| $C_9$+ Hydrocarbons | 34.73 | 51.65 |

Example II

A crude butadiene by-product hydrocarbon from a hydrocarbon pyrolysis unit was reacted over 0.25 g of powdered copper-exchanged zeolite prepared as in Example I. Reactor temperature was 450° C., pressure was ambient and crude butadiene flow rate was 5 cc/min. Reaction products were collected in a liquid nitrogen trap, then flushed into a gas chromatograph with helium at ambient temperature. The gas chromatograph was an OV-101 column and samples were analyzed using both a flame detector and a thermal conductivity detector.

Analyses of the crude butadiene feed and the products from the reaction are shown in the tables below.

| Analysis of Crude Butadiene Feed | |
|---|---|
| Compounds | Weight Percent |
| $C_3$'s and lighter | 1.24 |
| Isobutane | 2.57 |
| n-Butane | 8.68 |
| 1-Butene, Isobutylene | 33.74 |
| t-2-Butene | 4.15 |
| c-2-Butene | 2.44 |
| 1,3-Butadiene | 45.72 |
| $C_4$ Acetylenes | 1.28 |
| $C_5$ Hydrocarbons | 0.19 |

| Product Analysis From Conversion of Crude Butadiene | |
|---|---|
| Compounds | Weight Percent |
| $C_1-C_4$ | 41.4 |
| $C_5 + C_6$ Aliphatics | 1.2 |
| Benzene | 11.5 |
| Toluene | 20.7 |
| Ethylbenzene, Xylenes | 19.5 |
| $C_9+$ Hydrocarbons | 5.8 |

Thus it is apparent that there has been provided, according to the invention, a process that is uniquely effective in treating by-product effluent streams from pyrolytic cracking processes.

References

Mobil Oil U.S. Pat. No. 3,442,795
Mobil Oil U.S. Pat. No. 3,702,886
Mobil Oil U.S. Pat. No. 3,728,408
Mobil Oil U.S. Pat. No. 3,760,024
Mobil Oil U.S. Pat. No. 3,790,471
Mobil Oil U.S. Pat. No. 3,813,330
Mobil Oil U.S. Pat. No. 3,970,544
Mobil Oil U.S. Pat. No. 4,097,367
Mobil Oil U.S. Pat. No. 4,105,541
Mobil Oil U.S. Pat. No. 4,120,910
Mobil Oil U.S. Pat. No. 4,150,006
Mobil Oil U.S. Pat. No. 4,150,062
Mobil Oil U.S. Pat. No. 4,157,293
Mobil Oil European Patent Application No. 15,132
Mobil Oil European Patent Application No. 23,089
Mobil Oil European Patent Application No. 26,030
Shell Internationale Research Maatschappij, UK Patent Application No. 2,044,289
Shell Internationale Research Maatschappij, UK Patent Application No. 2,044,290
Shell Internationale Research Maatschappij, NL Pat. No. 7,902,019
Shell Internationale Research Maatschappij, NL Patent Application No. 8,001,342
Union Carbide U.S. Pat. No. 3,444,253
Union Carbide U.S. Pat. No. 3,497,462
Union Carbide U.S. Pat. No. 4,061,724
Union Carbide U.S. Pat. No. 4,170,571
Union Carbide U.S. Pat. No. 4,257,885
Erdolchemie Ger. Offen. No. DE 2,936,036
B.P. Belg. Pat. No. 862,051

We claim:

1. A low severity process for the preparation of a benzene-toluene-xylenes enriched stream containing minimal monoolefins and diolefins, from a feed stream comprising a by-product effluent of a process for the pyrolitic cracking of hydrocarbons to produce light olefins or diolefins, said by-product effluent stream containing olefins, diolefins, or a $C_4-C_{9+}$ fraction said process comprising contacting said by-product effluent stream, under low severity conditions including a temperature within the range of about 300°–700° C., a pressure within the range of about 0 to 100 atmospheres, and a weight hourly space velocity within the range of about 0.1 to about 20, with a catalyst essentially consisting of a divalent-copper-containing ZSM-5 type catalyst, said catalyst comprising an aluminosilicate zeolite of the ZSM-5 type, said zeolite prior to copper exchange having a silica/alumina ratio of between about 20 and 100, and an x-ray diffraction pattern having at least the d-spacings set forth in the "X-Ray Diffraction Pattern" table above, the resulting divalent copper exchanged zeolite catalyst having the formula:

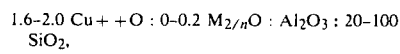

wherein M is at least one cation other than $Cu^{++}$.

2. Process of claim 1 wherein said conditions include a temperature within the range of about 350°–600° C., a pressure within the range of about 0–7 atmospheres, and a weight hourly space velocity within the range of about 0.5–5.0.

3. Process of claim 1 wherein said by-product effluent comprises a $C_4$ stream.

4. Process of claim 1 wherein said by-product effluent comprises a $C_5$ stream.

5. Process of claim 1 wherein said by-product effluent comprises a whole or fractionated dripolene stream.

6. Process of claim 1 wherein said feed stream is admixed with a diluent.

7. Process of claim 6 wherein said diluent is steam.

8. Process of claim 6 wherein said diluent is hydrogen.

9. Process of claim 6 wherein said diluent is a low boiling paraffin.

10. Process of claim 6 wherein said diluent is a mixture of a low boiling paraffin, hydrogen and/or steam.

11. Process of claim 1 wherein said ZSM-5 type catalyst is ZSM-5.

12. Process of claim 1 wherein said ZSM-5 type catalyst is ZSM-8.

13. Process of claim 1 wherein said ZSM-5 type catalyst is ZSM-11.

14. Process of claim 1 wherein said ZSM-5 type catalyst is a zeolite having an X-ray diffraction pattern similar to that of ZSM-5 but having an infrared spectrum exhibiting no absorption within the range of 3600–3100 $cm^{-1}$.

15. The process of claim 1 wherein said by-product effluent comprises a $C_9$ fraction.

* * * * *